United States Patent [19]
Ohta et al.

[11] Patent Number: 5,660,626
[45] Date of Patent: Aug. 26, 1997

[54] CEMENT DISPERSING AGENT

[76] Inventors: Akira Ohta, 1-5-42 Enzoh; Tomomi Sugiyama, 2722 Hagizono, both of Chigasaki-shi, Kanagawa-ken; Yoshio Tanaka, 4-4-3-904 Izumi Honmachi, Komae-shi, Tokyo, all of Japan

[21] Appl. No.: 593,302

[22] Filed: Jan. 31, 1996

[30] Foreign Application Priority Data

Jan. 31, 1995 [JP] Japan ................. 5-047708

[51] Int. Cl.$^6$ ................. C04B 24/04; C04B 24/02
[52] U.S. Cl. ................. 106/810; 106/728; 106/823; 524/5
[58] Field of Search ................. 106/810, 823, 106/728; 524/5

[56] References Cited

U.S. PATENT DOCUMENTS

| | | | |
|---|---|---|---|
| 4,547,223 | 10/1985 | Goto et al. | 106/802 |
| 4,814,014 | 3/1989 | Arfaei | 106/810 |
| 4,960,465 | 10/1990 | Arfaei | 106/810 |
| 5,047,087 | 9/1991 | Montague et al. | 106/810 |
| 5,091,014 | 2/1992 | Hihara et al. | 106/810 |
| 5,181,961 | 1/1993 | Umaki et al. | 106/724 |
| 5,358,566 | 10/1994 | Tanaka et al. | 106/810 |
| 5,362,323 | 11/1994 | Koyata et al. | 106/810 |
| 5,421,881 | 6/1995 | Rodrigues et al. | 106/810 |

FOREIGN PATENT DOCUMENTS

| | | | |
|---|---|---|---|
| 59-128242 | 7/1984 | Japan | 106/810 |
| 59-164660 | 9/1984 | Japan | 106/810 |
| 60-071559 | 4/1985 | Japan | 106/810 |
| 61-077652 | 4/1986 | Japan | 106/810 |

OTHER PUBLICATIONS

Derwent Abstract 92-045686/06: "Shrinkage Reducing Agent For Drying Cement", Sanyo Chem. Ind. Ltd, JP 3290342 (Apr. 3, 1990).

Derwent Abstract 81-38953D/22: "Agent For Reducing Dry Shrinkage of Cement Mixes":, Goto, et al., JP 56037259 (Apr. 10, 1981).

Derwent Abstract WPI 91-040592/06: "Shrinkable Reducing Agent for Cement Preventing Cracking", Hondo et al., JP 2307849 (Dec. 21, 1990).

*Primary Examiner*—Anthony Green
*Attorney, Agent, or Firm*—Carol A. Loeschorn; Andrew N. Parfomak

[57] ABSTRACT

A shrinkage-reducing dispersing agent for use in cementitious compositions such as concrete and mortar comprising a graft polymer which is a polycarboxylic acid or a salt thereof, having side chains derived from at least one species selected from (a) oligoalkyleneglycol and/or polyalcohol and (b) polyalkylene glycols or derivatives thereof.

8 Claims, 1 Drawing Sheet

CEMENT DISPERSING AGENT

The invention relates to a cement dispersing agent which can be used in a cement composition, such as cement paste, grout, mortar and concrete.

Generally, cement compositions show a volume decrease when hardening or drying. This volume decrease is called "drying shrinkage" and is a major cause of cracking in walls, floor panels and in concrete construction.

This cracking brings about inter alia the reduction of rigidity and of watertightness and a deterioration in appearance. It also accelerates the degradation of concrete by permitting water and air to permeate into the concrete. This can, for example, accelerate the occurrence of rust in reinforcing bars, and thereby cause cracking to an even greater extent.

One suggested counter-measure against shrinkage is the addition of an expanding admixture such as a mixture of calcium sulfoaluminate and calcium oxide. The drying shrinkage can also be reduced making the proportion of water in the concrete small. The Japan Society of Architecture defines the upper limit value of the unit water contents in highly durable concrete as not more than 175 Kg per cubic meter. To meet this rule, there is generally used a high-range air-entraining, water-reducing agent with a high water-reducing property.

Further, with the aim of reducing the drying shrinkage itself, the addition of shrinkage-reducing agents such as polyoxyalkylenealkyl ethers, alkoxypolyalkylene fatty acid esters and alcohols has been proposed. However, such an agent cannot be used when the drying shrinkage continues for a long period because concrete expansion finishes at a very early stage in the cement hardening process. In addition, it is difficult to determine an appropriate amount for reducing drying shrinkage in each individual case of such agents.

Additionally, the method of reducing concrete unit water content by using a high-range air-entraining, water-reducing agent does not give a satisfactory shrinkage reducing effect.

Further, the abovementioned shrinkage-reducing agents have the defect that the amount needed to obtain a sufficiently large shrinkage reducing effect is very large and it is not economical. It is necessary also to use anti-foaming agents as they tend to entrain large volumes of air. It is also necessary to reduce concrete unit water contents, and this generally requires the combined usage of an air-entraining, water-reducing agent and a high-range air-entraining, water-reducing agent.

The object of the invention is to provide a cement dispersing agent which has both the shrinkage-reducing effect of a conventional shrinkage-reducing agent and which achieves these ends when used in relatively low dosages.

It has now been found that the abovementioned objects can be achieved by a cementitious composition shrinkage-reducing dispersing agent which comprises a graft polymer which is a polycarboxylic acid or a salt thereof, having side chains derived from at least one species selected from (a) oligoalkyleneglycol and/or polyalcohol and (b) polyalkylene glycols or derivatives thereof.

Figure 1:
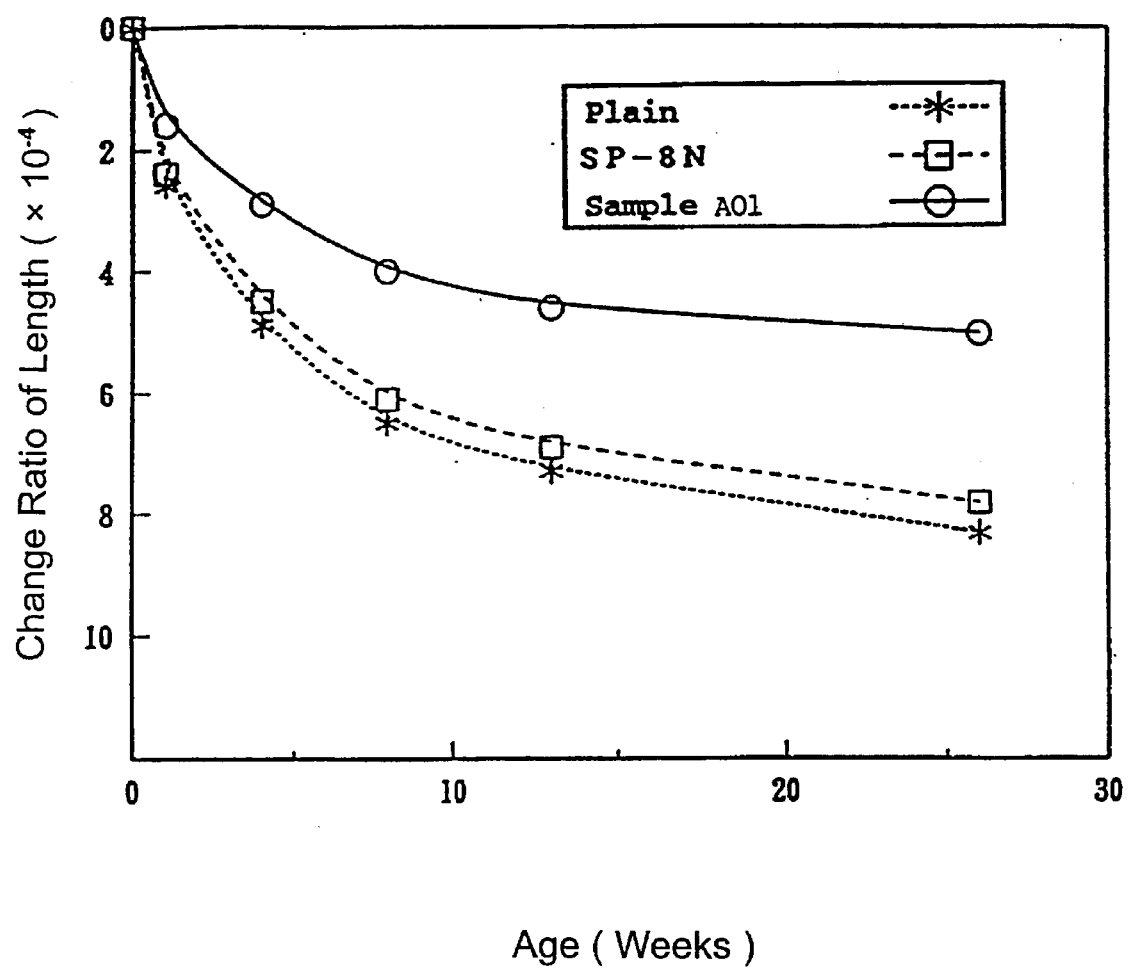
FIG. 1 is a graphical representation of the drying shrinkage of a cement containing a cement dispersing agent of the instant invention over time, compared with plain cement and a cement containing a commercially available high-range, air-entraining, water-reducing agent.

By "polycarboxylic acid" is meant a polymer having at least two carboxylic acid groups pendant therefrom. Polycarboxylic acids or the salts thereof suitable for use in the invention include styrene-maleic anhydride copolymers, their partial esters, and the salts thereof, allylether-maleic anhydride copolymers, their derivatives, and the salts thereof and (meth)acrylic acid-(meth)acrylic acid ester copolymers, their derivatives, and the salts thereof. Typical examples of suitable salts include alkali metal salts, alkaline earth metal salts, lower amine salts and lower alkylamine salts.

Suitable oligoalkyleneglycols include alkylaminooligoalkylene glycols, oligoalkylene glycol alkylphenyl ethers and oligoalkyleneglycol monoalkylethers such as diethylene glycol-dipropylene glycol monobutyl ethers, tetraethylene glycol-tetrapropylene glycol monobutyl ethers, diethylene glycol-propylene glycol monobutyl ethers, tetrapropylene glycol monomethyl ethers, tetraethylene glycol monoisopropyl ethers, and the derivatives thereof. Such compounds include derivatives in which there is present an ester group, an epoxy group or polyfunctional alcohol.

The polyalcohol is selected from the group consisting of neopentyl glycol, pentaerythritol, neopentyl glycol hydroxypivalate and derivatives thereof.

Suitable polyalkylene glycols or the derivatives include ethylene oxide polymers, propylene oxide polymers, and ethylene oxide-propylene oxide block copolymers with antifoaming properties, their monoalkyl (1 to 14 C atoms) ethers, their mono esters, and the derivatives thereof. Examples of derivatives include a fatty acid ester or a phosphoric acid ester. A particularly useful derivative is an acetylene derivative; an example of a suitable polyalkylene glycol derivative is an acetylene alcohol polyoxyethylene adduct, available commercially, for example, as "Surfynol" (trade mark) 440 ex Nisshin Kagaku KK.

The dosage of the agent of the invention is basically that amount which can give desirable cement dispersing and low shrinkage properties. In the case of ready-mixed concrete, it is the amount which can produce desired concrete water-reducing properties.

It is possible to use with the agents of this invention other art-recognized ingredients in art-recognized quantities. Examples of such materials include air-entraining, water-reducing agents; water-reducing agents; high-range water-reducing agents; high-range air-entraining, water-reducing agents; setting retarders; setting and hardening accelerators; thickeners; anti-foaming agents, and so on.

The agents of this invention have excellent storage stability and give excellent results when used in very small quantities compared to those used with conventional drying shrinkage agents. The invention therefore also provides a method of reducing the shrinkage of a cementitious composition by adding thereto a shrinkage-reducing quantity of an agent as hereinabove described. The invention further provides a low-shrinkage cementitious composition which comprises a shrinkage-reducing quantity of an agent as hereinabove described.

The invention is further described with reference to the following non-limiting examples.

Preparation examples

1) Preparation of polycarboxylic acid

Preparation 1

Styrene-maleic anhydride copolymer (Sample S)

To a glass reaction vessel equipped with thermometer, stirrer, nitrogen gas inlet, dropping funnel and reflux condenser are added methyl isobutyl ketone (MIBK) 321.4 wt. parts, maleic anhydride (MAN) 147.0 wt. parts and dodecyl mercaptan (DOMER, chain transfer agent) 6.0 wt. parts, and the atmosphere of the reaction vessel is replaced by nitrogen under stirring. The mixture is heated to 110° C., and azobisisobutyronitrile (AIBN, polymerization initiator) 6.00 wt. parts and styrene 156.0 wt. parts are added dropwise over a period of 1 hr. After keeping the reaction mixture at the temperature under stirring for a further 2.5 hr., it is cooled to room temperature. The result is a styrene-maleic anhydride copolymer (SMA polymer), Sample S, whose mean molecular weight by weight is 21000 (calculated in terms of polyethylene glycol (PEG)).

Preparation 2

Allyl ether-maleic anhydride copolymer (Sample A(A))

To a glass reaction vessel equipped with thermometer, stirrer, nitrogen gas inlet, dropping funnel and reflux condenser, are added allyl ether (manufactured by Nihon Yushi Co., Ltd.) 336 wt. parts, maleic anhydride 98.0 wt. parts, benzoyl peroxide (B.P) 6.0 wt. parts and toluene 566.0 wt. parts, and the atmosphere of the reaction vessel is replaced by nitrogen under stirring. The mixture is heated to 80° C., and allowed to react, maintaining the temperature for 4 hr. The reaction mixture is evaporated at 110° C. under reduced pressure, 10 mm Hg, to remove toluene, and brought to ordinary pressure to give an allyl ether-maleic anhydride copolymer (AMA polymer-a), Sample A(A), whose mean molecular weight by weight is 23000 (calculated in terms of PEG).

Preparation 3

Allyl ether-styrene-maleic anhydride copolymer (Sample A(C))

To a glass reaction vessel equipped with thermometer, stirrer, nitrogen gas inlet, dropping funnel and reflux condenser, are added allyl ether (manufactured by Nihon Yushi Co., Ltd.) 201.6 wt. parts, styrene 41.6 wt. parts, maleic anhydride 98.0 wt. parts, benzoyl peroxide (B.P.) 6.0 wt. parts and toluene 566.0 wt. parts, and the atmosphere of the reaction vessel is replaced by nitrogen under stirring. The mixture is heated to 80° C., and is allowed to react keeping the temperature constant for 4 hr. The reaction mixture is then evaporated at 110° C. under reduced pressure, 10 mm Hg, to remove toluene, and brought to ordinary pressure and temperature to give an allyl ether-styrene-maleic anhydride copolymer (AMA polymer-b) Sample A(C).

2) Preparation of graft copolymer

Preparation 4

(Sample S02)

To a glass reaction vessel equipped with thermometer, stirrer, nitrogen gas inlet, dropping funnel and reflux condenser are added SMA polymer prepared in Preparation 1, 200.7 wt. parts (solid portion, 101 wt. parts), MIBK 150.0 wt. parts and tributyl amine (TMAm) 13.3 wt. parts. The mixture is heated to 110° C., and polyethylene glycol monomethyl ether (M-PEG 500: MW=500) 500 wt. parts, polyalkylene glycol (polyoxyethylene-polyoxypropylene adduct "Pluronic" (trademark) L-61 ex Adeka Co.) 58.0 wt. parts and tributyl amine (TMAm) 13.3 wt. parts which are placed together in dropping funnel are added dropwise. After the reaction mixture is kept under stirring at 110° C. for 3 hr., MIBK was evaporated to give the graft polymer, Sample S02.

Preparation 5

(Sample A01)

To a glass reaction vessel equipped with thermometer, stirrer, dropping funnel and reflux condenser are added 108.5 wt. parts of AMA polymer-a prepared in Preparation 2 and MIBK 150.0 wt. parts. The mixture is heated to 110° C., and diethylene glycol dipropylene glycol monobutyl ether (GE-42-2P, manufactured by Nissou Maruzen Chemical Co. Ltd.) 173.8 wt. parts, polyalkylene glycol (L-64: manufactured by Adeka Co., Ltd.) 46.0 wt. parts and TBAm 13.33 wt. parts which are placed together in dropping funnel are added dropwise. After the reaction mixture was kept under stirring at 110° C. for 3 hr., it is cooled to room temperature and diluted with water to give a 40% aqueous solution of the obtained graft polymer, Sample A01.

Preparation 6

(Sample A02)

To a glass reaction vessel equipped with thermometer, stirrer, dropping funnel and reflux condenser, are added 108.5 wt. parts of AMA polymer-a prepared in Preparation 2 and MIBK 150.0 wt. parts. The mixture is heated to 110° C., and diethylene glycol propylene glycol monobutyl ether (GE-42-1P: manufactured by Nissou Maruzen Chemical Co., Ltd.) 139.1 wt. parts, and TBAm 13.3 wt. parts which are placed together in dropping funnel are added dropwise. After the reaction mixture is kept under stirring at 110° C. for 3 hr., it is cooled to room temperature and diluted with water to give a 40% aqueous solution of the obtained graft polymer, Sample A02.

Preparation 7

(Sample A07)

To a glass reaction vessel equipped with thermometer, stirrer, dropping funnel and reflux condenser are added 113.7 wt. parts of AMA polymer-b prepared in Preparation 2 and MIBK 150 wt. parts. The mixture was heated to 110° C., and GE-42-2P 181.2 wt. parts, L-64 (52.0 wt. parts) and TBAm 13.3 wt. parts which are placed together in the dropping funnel are added dropwise. After the reaction mixture is kept under stirring at 110° C. for 3 hr., it is cooled to room temperature and diluted with water to give a 40% aqueous solution of the obtained graft polymer, Sample A07.

Preparation 8

(MAA polymer, Sample M01)

To a glass reaction vessel equipped with thermometer, stirrer, nitrogen gas inlet, and reflux condenser are added acrylic acid chloride 120 wt. parts, GE-42-2P 306 wt. parts, triethyl amine 100.0 wt. parts and toluene 500 wt. parts. The mixture is reacted at 80° C. for 10 hr., cooled to room temperature, and extracted with diethyl ether to give the acrylic acid (GE422P) ester. The acrylic acid ("Surfynol" (trade mark) 440) ester is obtained by an analogous method.

To a glass reaction vessel equipped with thermometer, stirrer, nitrogen gas inlet, dropping funnel and reflux condenser are added isopropyl alcohol (IPA) 195.0 wt. parts, and the atmosphere of the reaction vessel is replaced by nitrogen. It is heated to 80° C., and over a period of 2 hr. is added dropwise a mixture of methoxy 9 ethylene glycol methacrylate (NK-M90G: manufactured by Shinnakamura Chemical Co., Ltd.) 66.5 wt. parts, methacrylic acid 23.1 wt. parts, the acrylic acid ester hereinabove obtained (GE422P) 40.5 wt. parts, the above acrylic acid ("Surfynol" 440) ester 2.3 wt. parts, B.P 1.2 wt. parts, and IPA 120.0 wt. parts. B.P 0.245 wt. parts, and IPA 5 wt. parts are then added, and after 30 min. were added once more B.P 0.245 wt. parts, and IPA 5 wt. parts. The reaction mixture is stirred, keeping the temperature constant for 1 hr. and 30 min., cooled to room temperature, and neutralized by adding a 30% sodium hydroxide solution 15 wt. parts and water 100 wt. parts. IPA in the mixture is removed by evaporator to give the graft polymer, Sample M01 (molecular weight: 34000 calculated in terms of PEG).

According to the abovementioned preparations and by analogous methods, there are prepared four series of graft copolymers, a series of graft polymers of the general formula S (styrene-maleic anhydride copolymer, its partial ester and its derivative:SMA polymer), a series of the general formula A (allylether-maleic anhydride copolymer and its derivative:AMA polymer), a series of the general formula B (isobutylene-maleic anhydride copolymer its partial ester and its derivative:BMA polymer) and a series of the general formula M (meth)acrylic acid-(meth)acrylic acid ester copolymer:MAA polymer) are prepared. Each graft polymer prepared is shown in Table 1.

General formula S

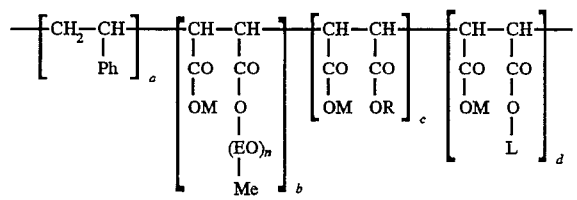

(wherein M is H, alkali metal, alkaline earth metal, lower amine or lower alkanolamine, Ph is a phenyl group, Me is a methyl group, R is oligoalkyleneglycol and/or polyalcohol, L is H, polyalkyleneglycol or its derivatives, EO is an ethylene glycol residual group, n is an integer of from 1 to 100, a is 1, b is 0.5, c is 0.5–0.45 and d is 0–0.05).

General formula A

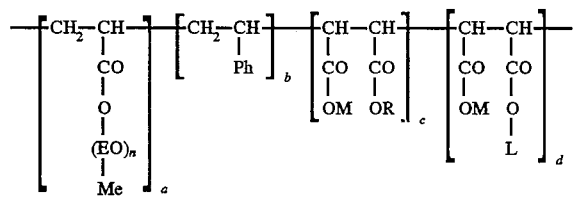

(wherein M is H, alkali metal, alkaline earth metal, lower amine or lower alkanolamine, Ph is a phenyl group, Me is methyl group, R is oligoalkyleneglycol and/or polyalcohol, L is H, polyalkyleneglycol or its derivatives, EO is an ethylene glycol residual group, n is an integer 1–100, a is 1, b is 0.5, c is 0.5–0.45 and d is 0–0.05).

General formula B

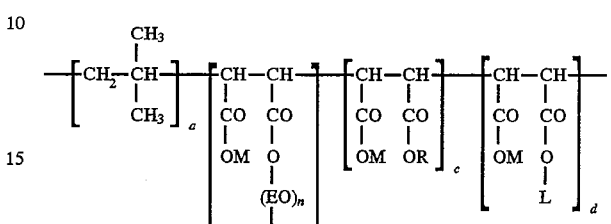

(wherein M is H, alkali metal, alkaline earth metal, lower amine or lower alkanolamine, Me is a methyl group, R is oligoalkyleneglycol and/or polyalcohol, L is H, polyalkyleneglycol or its derivatives, EO is an ethylene glycol residual group, n is an integer of from 0 to 100, a is 1, b is 0.5, c is 0.5–0.45 and d is 0–0.05.)

General formula M

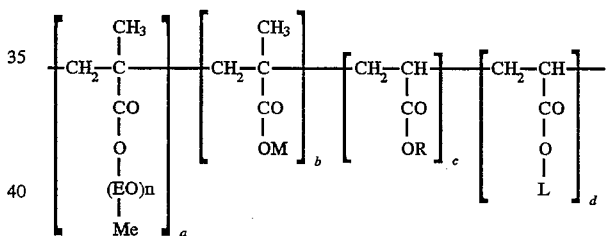

(wherein M is H, alkali metal, alkaline earth metal, lower amine or lower alkanolamine, Ph is a phenyl group, Me is methyl group, R is oligoalkyleneglycol and/or polyalcohol and L is H, polyalkyleneglycol or its derivatives, EO is an ethylene glycol residual group, n is an integer of from 1–100, a is 0.5–5, b is 0.5–10, c is 0.1–5 and d is 0–0.2).

TABLE 1

| P | S | Monomer Composition | | | | | | L | MW | ST | |
|---|---|---|---|---|---|---|---|---|---|---|---|
| | | a | b | c | d | n | R | | | conc | MV |
| SMA | S | 1.0 | 0 | 1.0 | 0 | 12 | M | — | 21000 | 0.38 | 58.2 |
| | S01 | 1.0 | 0.97 | 0 | 0.03 | 12 | — | L61 | 24000 | 0.38 | 58.4 |
| | S02 | 1.0 | 0.50 | 0.47 | 0.03 | 12 | Bu—O(EO)$_2$(PO)$_2$—H | L61 | 19000 | 0.38 | 40.0 |
| | S03 | 1.0 | 0.50 | 0.47 | 0.03 | 12 | Bu—O(EO)$_4$(PO)$_4$—H | L61 | 22000 | 0.38 | 43.2 |
| | S04 | 1.0 | 0.50 | 0.47 | 0.03 | 12 | Bu—O(EO)$_2$(PO)$_1$—H | L61 | 18000 | 0.38 | 42.5 |
| | S05 | 1.0 | 0.50 | 0.47 | 0.03 | 12 | Me—O(PO)$_4$—H | L61 | 20000 | 0.38 | 43.8 |
| | S06 | 1.0 | 0.50 | 0.47 | 0.03 | 12 | iPr—O(EO)$_4$—H | L61 | 19000 | 0.38 | 43.6 |
| | S07 | 1.0 | 0.50 | 0.50 | 0 | 12 | Bu—O(EO)$_2$(PO)$_2$—H | — | 21000 | 0.38 | 41.3 |
| | S08 | 1.0 | 0.50 | 0.50 | 0 | 12 | Bu—O(EO)$_2$(PO)$_1$—H | — | 20000 | 0.38 | 41.1 |

TABLE 1-continued

| P | S | a | b | c | d | n | R | L | MW | ST conc | ST MV |
|---|---|---|---|---|---|---|---|---|---|---|---|
| | S09 | 1.0 | 0.50 | 0.47 | 0.03 | 12 | $(Me)_2N-(EO)_1-H$ | L61 | 18000 | 0.38 | 41.5 |
| | S10 | 1.0 | 0.50 | 0.47 | 0.03 | 12 | $(Bu)_2N-(EO)_1-H$ | L61 | 20000 | 0.38 | 40.4 |
| | S11 | 1.0 | 0.50 | 0.50 | 0 | 12 | $Ph-O(Ph)_{15}-H$ | — | 23000 | 0.38 | 43.2 |
| | S12 | 1.0 | 0.50 | 0.47 | 0.03 | 12 | $(Me)_2Ph-O(PO)_{13}-H$ | L61 | 21000 | 0.38 | 45.1 |
| | S13 | 1.0 | 0.50 | 0.47 | 0.03 | 12 | $(C_9H_{19})Ph-O(EO)_3-(PO)_{12}-H$ | L61 | 23000 | 0.38 | 42.3 |
| | S14 | 1.0 | 0.50 | 0.47 | 0.03 | 12 | NPG | L61 | 20000 | 0.38 | 40.9 |
| | S15 | 1.0 | 0.50 | 0.50 | 0 | 12 | PE | — | 21000 | 0.38 | 43.1 |
| | S16 | 1.0 | 0.50 | 0.47 | 0.03 | 12 | ESG | L61 | 23000 | 0.38 | 41.7 |
| AMA | A(A) | 1.0 | 0 | 1.0 | 0 | 6 | M | — | 23000 | 0.34 | 52.6 |
| | A(B) | 1.0 | 0 | 1.0 | 0 | 11 | M | — | 21000 | | |
| | A(C) | 0.5 | 0.5 | 1.0 | 0 | 12 | M | — | 19000 | | |
| | A01 | 1.0 | 0 | 0.97 | 0.03 | 6 | $Bu-O(EO)_2(PO)_2-H$ | L64 | 21000 | 0.34 | 38.2 |
| | A02 | 0.99 | 0.01 | 0.97 | 0.03 | 6 | $Bu-O(EO)_2(PO)_1-H$ | L64 | 22000 | 0.34 | 35.9 |
| | A03 | 1.0 | 0 | 1.0 | 0 | 6 | $Bu-O(EO)_2(PO)_2-H$ | — | 20000 | 0.34 | 34.1 |
| | A04 | 1.0 | 0 | 0.97 | 0.03 | 6 | $Bu-O(EO)_2(PO)_2-H$, PE | L64 | 22000 | 0.34 | 38.2 |
| | A05 | 1.0 | 0 | 0.97 | 0.03 | 11 | PE | L64 | 26000 | 0.34 | 40.2 |
| | A06 | 1.0 | 0 | 1.0 | 0 | 11 | PE | — | 21000 | 0.34 | 40.0 |
| | A07 | 0.60 | 0.40 | 0.97 | 0.03 | 12 | $Bu-O(EO)_2(PO)_2-H$ | L64 | 22000 | 0.34 | 41.2 |
| | A08 | 0.50 | 0.50 | 1.0 | 0 | 12 | $Bu-O(EO)_2(PO)_2-H$ | — | 23000 | 0.34 | 43.1 |
| | A09 | 0.50 | 0.50 | 1.0 | 0 | 12 | PE | — | 26000 | 0.34 | 45.1 |
| | A10 | 0.60 | 0.40 | 0.97 | 0.03 | 12 | PE | L64 | 22000 | 0.34 | 43.5 |
| BMA | B | 1.0 | 0 | 1.0 | 0 | 12 | M | — | 6000 | 0.68 | 61.8 |
| | B01 | 1.0 | 0.97 | 0 | 0.03 | 12 | — | L61 | 7000 | 0.68 | 60.5 |
| | B02 | 1.0 | 0.50 | 0.47 | 0.03 | 12 | $Bu-O(EO)_2(PO)_2-H$ | L61 | 17000 | 0.68 | 43.2 |
| | B03 | 1.0 | 0.50 | 0.50 | 0 | 12 | $Bu-O(EO)_4(PO)_4-H$ | — | 25000 | 0.68 | 45.1 |
| | B04 | 1.0 | 0.50 | 0.47 | 0.03 | 12 | $Me-O(PO)_4-H$ | L61 | 16000 | 0.68 | 44.2 |
| | B05 | 1.0 | 0.50 | 0.47 | 0.03 | 12 | $(Me)_2N-(EO)_1-H$ | L61 | 9000 | 0.68 | 43.7 |
| MAA | M | 1.0 | 5.0 | 0 | 0.05 | 10 | — | 440 | 36000 | 0.29 | 58.2 |
| | M01 | 1.0 | 2.0 | 1.0 | 0 | 10 | $Bu-O(EO)_2(PO)_2-H$ | — | 34000 | 0.29 | 41.0 |
| | M02 | 1.0 | 2.0 | 1.0 | 0.05 | 10 | $Bu-O(EO)_2(PO)_2-H$ | 440 | 32000 | 0.29 | 42.1 |
| | M03 | 1.0 | 2.0 | 2.0 | 0.05 | 25 | $Bu-O(EO)_2(PO)_1-H$ | 440 | 42000 | 0.29 | 40.1 |
| | M04 | 1.0 | 1.0 | 1.5 | 0.10 | 25 | $Bu-O(EO)_2(PO)_2-H$ | 440 | 39000 | 0.29 | 40.6 |
| | M05 | 1.0 | 3.0 | 3.0 | 0.10 | 35 | $Bu-O(EO)_2(PO)_1-H$ | 440 | 40000 | 0.29 | 39.2 |
| | M06 | 1.0 | 2.0 | 1.0 | 0 | 10 | $(Me)_2N-(EO)_1-H$ | — | 34000 | 0.29 | 41.0 |
| | M07 | 1.0 | 2.0 | 1.0 | 0.05 | 10 | $(Bu)_2N-(EO)_1-H$ | 440 | 32000 | 0.29 | 42.1 |
| | M08 | 1.0 | 2.0 | 2.0 | 0.05 | 25 | $Ph-O(PO)_{12}-H$ | 440 | 42000 | 0.29 | 40.1 |
| | M09 | 1.0 | 1.0 | 1.5 | 0.10 | 25 | NPG | 440 | 39000 | 0.29 | 40.6 |
| | M10 | 1.0 | 3.0 | 3.0 | 0.10 | 35 | PE | 440 | 40000 | 0.29 | 39.4 |

Heading abbreviations
P = polymer
S = Sample
MW = molecular weight (weights average by GPC, calculated value in terms of PEG)
ST = surface tension
conc = concentration (%) (adjusted to the same)
MV = measured value (dynes/cm$^2$)
L = type of polyalkyleneglycol

WORKING EXAMPLES

1) Preparation of cement dispersing agent

The Cement dispersing agents consisting of a solution of the graft polymers of Preparations 1–16 (Table 3, Example 1–39) are prepared. For comparison are prepared cement dispersing agents consisting of mixed solutions of a graft polymer to which are added high-range air-entraining, water-reducing agent and/or anti-foaming agents anti-foaming agents (Table 3, Comparative Example 1–10).

2) Storage stability test of the solution

The cement dispersing agent consisting of the solution of graft polymer (Samples: M02-05, M07-10, B02, B04, B05, A01, A02, A04, A05, A10, S02-06, S09, S10, S12-14, S16) bound with an anti-foaming polyalkyleneglycol or its derivatives, and a cement dispersing agent consisting of a mixed solution of an anti-foaming agent and the graft polymer S07 which does not bind with an anti-foaming agent, are allowed to stand and reserved at 50° C. The storage stability of the solutions are assessed by observing the degree of miscibility by eye. As the test results, the mixed solution of S07 and the anti-foaming agent [polyalkyleneglycol (trade mark: Pluronic L-61: manufactured by Adeka Co., Ltd.] show the separation of S07 and the anti-foaming agent into two phases after 24 hr., however, no separation is observed in the solution of graft polymer bound with the anti-foaming polyalkyleneglycol or its derivatives.

3) Preparation of concrete 3-1) Preparation of concrete

Concrete is designed to have slump of 18.5±1.5 cm. and air content 4.5±0.5% Two types of blend are made, plain concrete (Blend I) which contains no additives and a blend (Blend II) in which water contents are reduced by 18% from the plain concrete as shown in Table 2. Each material is measured such that the admixture amount is 80 liters, and all the materials containing cement dispersing agent consisting of a graft polymer of Preparations 1–16 are added to a 100 liter pan-type forced mixing mixer, and mixed for 90 sec. to give the concrete shown in Table 3 (Examples 1–39, Comparative Examples 1–10). Further, the amount of air is adjusted by using an anti-foaming agent or an air-entraining agent as required.

TABLE 2

| Type of blend | W/C (%) | s/a (%) | Unit amount (kg/m³) | | | |
|---|---|---|---|---|---|---|
| | | | Cement | Water | Fine aggregate | Coarse aggregate |
| I | 63.8 | 50.0 | 320 | 204 | 884 | 901 |
| II | 52.2 | 49.0 | 320 | 167 | 875 | 928 |

3-2) Materials used a. Fine aggregate: Oi River System pit sand (specific gravity 2.60, fineness modulus 2.76)

b. Coarse aggregate: Oume sandstone crushed stone (specific gravity 2.65, maximum particle diameter 20 mm)

c. Cement: ordinary portland cement (specific gravity 3.16, mixed the cement manufactured by Chichibuonoda, Sumitomo and Mitsubishi companies in equal amount)

d. High-range air-entraining, water-reducing agent: Rheobild SP-8N (SP8 for short) manufactured by NMB Co., Ltd., Rheobild SP-9N (SP9 for short) manufactured by NMB Co., Ltd.

e. Drying shrinkage reducing agent: diethylene glycol dipropylene glycol monobutyl ether, GE-42-2P (GE2P for short), manufactured by Nissou Maruzen Chemical Co., Ltd.

f. Anti-foaming agent: air volume adjusting agent No. 404 exNMB (main components, polyalkylene derivatives).

g. Polycarboxylic acid and graft polymer: graft polymer from Preparations 1-16.

4) Concrete test methods a. Slump: According to JIS A 1101, the testing was carried out just after mixing and at 60 min. later.

b. Change of length: According to JIS A 1132 and JIS A 1129.

c. Amount of air: According to JIS A 1128.

d. Setting time: According to JIS A 6204 Supplement 1.

e. Compressive strength: Measurement at the age 28 days according to JIS A 1132 and JIS A 1108.

5) Test results of concrete

The test results of concrete are shown in Table 3 and the following effect is ascertained.

a. Water-reducing property

Examples 1–17 in which the graft polymers (S-3~9, A-2~6, M-2~6) related to the invention are used show in the blend II with 18% water reduction from the blend I of plain concrete the equal slump (flowing property) to Comparative examples 2 and 3 in which the high-range air-entraining, water-reducing agents (SP8, SP9) are used and to Comparative examples 4~6 in which the polycarboxylic acids (S-2, A-1, M-1) are used. Their water-reducing property is equal to that of the high-range air-entraining, water-reducing agents.

Further, as is evident from the comparison between Comparative example 4 and Examples 1~7, between Comparative example 5 and Examples 8~12, and between Comparative example 6 and Examples 13~16, in the graft polymers related to the invention is obtained a equal water-reducing property equal to that in the polycarboxylic acid salts with equal dosage.

b. Slump lowering over time

In Examples 1~17, the slump lowering over the passage of time is small compared to that in Comparative example 1, and the slump values at 60 min. later are almost equal to those measured just after mixing as is same in Comparative examples 2 and 3. Their slump lowering over time course is extremely small as are those of the high-range air-entraining, water-reducing agents.

c. Drying shrinkage reducing effect (see FIG. 1)

The drying shrinkage reducing ratio of Comparative examples 2~6 is slightly lower than that of Comparative example 1, and the effect is insufficient.

Examples 1~7 and Comparative example 7 demonstrate the excellent drying shrinkage reducing effect compared to those of Comparative example 1 and Comparative examples 2~6.

Further, as is evident from the comparison between Examples 1~17 and Comparative example 7, there is demonstrated an excellent drying shrinkage reducing effect at such an extremely small amount added that the dosages in Examples 1~17 were 0.15~0.38% by cement weight. On the contrary, it was necessary to add the polycarboxylic acid salt, S-2, in 0.2% and the drying shrinkage reducing agent, GE2P, in 2.0% in such a large amount in order that Comparative example 7 obtain a drying shrinkage reducing effect equal to that of Examples 1~17.

d. Air-entraining property

As there is no air-entraining property in Examples 1~5, 8, 9, 11, 14~17 in which the graft polymers introduced with polyalkylene glycol have an anti-foaming property, the amounts of air are adjusted by using, air-entraining agents. Further, as Examples 6, 7, 10, 12 and 13 have air-entraining properties, the amount of air is adjusted by using the anti-foaming agent.

e. Setting time

The setting times in Examples 1~17 are equal to those in Comparative examples 2 and 3, and there is almost no set retarding property.

f. Compressive strength

The compressive strength of Examples 1~17 is equal to or more than that of Comparative examples 2 and 3.

The cement dispersing agent of the invention can reduce the drying shrinkage of a cement composition by using an extremely small dosage, and it has water-reducing properties. This reduces unit water content and makes it possible to prepare cement compositions (economically) with excellent durability.

TABLE 3

| | | | | slump (cm) | | Air | DSR | | | | | setting (hr/min) | | |
|---|---|---|---|---|---|---|---|---|---|---|---|---|---|---|
| Expt | AS | AMT | B | OA | 60 | % | 1W | 4W | 8W | 13W | 26W | St. | End | CS |
| 1 | SO2 | 0.20 | II | 18.0 | 17.0 | 4.5 | 2.0 | 4.3 | 5.5 | 6.4 | 6.9 | 6:20 | 8:40 | 419 |
| 2 | SO3 | 0.20 | II | 19.5 | 15.0 | 4.3 | 2.0 | 4.5 | 5.9 | 6.3 | 6.8 | 6:15 | 8:30 | 420 |
| 3 | SO4 | 0.20 | II | 18.5 | 14.0 | 4.5 | 2.0 | 4.4 | 5.7 | 6.4 | 6.9 | 6:05 | 8:20 | 430 |
| 4 | SO5 | 0.20 | II | 19.0 | 17.5 | 4.2 | 2.1 | 4.4 | 5.7 | 6.5 | 6.9 | 6:20 | 8:30 | 420 |

TABLE 3-continued

| Expt | AS | AMT | B | slump (cm) OA | 60 | Air % | DSR 1W | 4W | 8W | 13W | 26W | setting (hr/min) St. | End | CS |
|---|---|---|---|---|---|---|---|---|---|---|---|---|---|---|
| 5 | SO6 | 0.20 | II | 18.5 | 17.5 | 4.9 | 2.0 | 4.4 | 5.7 | 6.4 | 6.7 | 6:20 | 8:30 | 410 |
| 6 | SO7 | 0.20 | II | 17.5 | 17.0 | 4.2 | 2.0 | 4.3 | 5.6 | 6.3 | 6.7 | 6:10 | 8:20 | 423 |
| 7 | SO8 | 0.20 | II | 18.5 | 17.0 | 4.6 | 2.1 | 4.4 | 5.6 | 6.4 | 6.8 | 6:25 | 8:25 | 416 |
| 8 | SO9 | 0.20 | II | 18.5 | 17.0 | 4.2 | 2.1 | 4.2 | 5.6 | 6.4 | 6.9 | 6:10 | 8:30 | 415 |
| 9 | S10 | 0.20 | II | 18.0 | 17.0 | 4.3 | 2.2 | 4.3 | 5.9 | 6.5 | 6.7 | 6:20 | 8:35 | 420 |
| 10 | S11 | 0.20 | II | 18.0 | 16.5 | 4.0 | 2.1 | 4.3 | 5.7 | 6.4 | 6.8 | 6:45 | 8:45 | 423 |
| 11 | S12 | 0.20 | II | 19.0 | 18.0 | 4.9 | 2.0 | 4.2 | 5.5 | 6.4 | 6.9 | 6:40 | 8:20 | 413 |
| 12 | S13 | 0.20 | II | 18.5 | 17.5 | 4.6 | 2.0 | 4.4 | 5.6 | 6.7 | 6.9 | 6:20 | 8:25 | 421 |
| 13 | S14 | 0.20 | II | 18.0 | 17.0 | 4.3 | 1.7 | 3.1 | 4.2 | 5.3 | 6.0 | 6:20 | 8:40 | 419 |
| 14 | S15 | 0.20 | II | 19.5 | 15.0 | 4.2 | 1.9 | 4.0 | 5.2 | 5.8 | 6.4 | 6:15 | 8:30 | 420 |
| 15 | S16 | 0.20 | II | 18.5 | 14.0 | 4.3 | 1.8 | 3.7 | 4.9 | 5.7 | 6.5 | 6:05 | 8:20 | 430 |
| 16 | A01 | 0.18 | II | 20.0 | 18.0 | 4.1 | 1.6 | 2.9 | 4.0 | 4.6 | 5.9 | 6:10 | 8:40 | 448 |
| 17 | A02 | 0.18 | II | 18.5 | 17.0 | 4.6 | 1.7 | 3.2 | 4.3 | 5.2 | 6.2 | 6:15 | 8:25 | 435 |
| 18 | A03 | 0.18 | II | 17.5 | 16.5 | 4.9 | 1.8 | 3.5 | 4.6 | 5.4 | 6.4 | 6:25 | 8:50 | 414 |
| 19 | A04 | 0.18 | II | 18.0 | 17.0 | 4.3 | 2.2 | 4.3 | 5.9 | 6.5 | 6.7 | 6:20 | 8:35 | 420 |
| 20 | A05 | 0.18 | II | 18.0 | 16.5 | 4.0 | 2.1 | 4.3 | 5.7 | 6.4 | 6.8 | 6:45 | 8:45 | 423 |
| 21 | A06 | 0.18 | II | 19.0 | 18.0 | 4.9 | 2.0 | 4.2 | 5.5 | 6.4 | 6.9 | 6:40 | 8:20 | 413 |
| 22 | A07 | 0.38 | II | 18.0 | 17.0 | 4.7 | 1.8 | 3.5 | 4.6 | 5.4 | 6.4 | 7:00 | 9:15 | 421 |
| 23 | A08 | 0.38 | II | 20.0 | 19.5 | 4.1 | 1.8 | 3.5 | 4.7 | 5.5 | 6.6 | 7:20 | 9:30 | 449 |
| 24 | A09 | 0.38 | II | 18.0 | 17.0 | 4.6 | 1.7 | 3.2 | 4.4 | 5.5 | 6.1 | 6:30 | 8:45 | 412 |
| 25 | A10 | 0.38 | II | 18.5 | 18.0 | 4.2 | 1.8 | 3.4 | 4.7 | 5.5 | 6.3 | 6:20 | 8:30 | 410 |
| 26 | B02 | 0.25 | II | 19.0 | 17.5 | 4.5 | 1.7 | 3.1 | 4.1 | 5.2 | 5.9 | 6:20 | 8:30 | 420 |
| 27 | B03 | 0.25 | II | 18.0 | 17.0 | 4.6 | 1.7 | 3.2 | 4.4 | 5.5 | 6.1 | 6:30 | 8:45 | 412 |
| 28 | B04 | 0.25 | II | 18.5 | 18.0 | 4.2 | 1.8 | 3.4 | 4.7 | 5.5 | 6.3 | 6:20 | 8:30 | 410 |
| 29 | B05 | 0.25 | II | 18.5 | 17.0 | 4.2 | 2.1 | 4.2 | 5.6 | 6.4 | 6.9 | 6:10 | 8:30 | 415 |
| 30 | M01 | 0.15 | II | 19.0 | 18.0 | 4.8 | 1.8 | 3.6 | 4.7 | 5.5 | 6.7 | 6:30 | 8:40 | 438 |
| 31 | M02 | 0.15 | II | 18.5 | 18.0 | 4.6 | 1.8 | 3.5 | 4.6 | 5.4 | 6.6 | 6:20 | 8:30 | 450 |
| 32 | M03 | 0.15 | II | 20.0 | 18.5 | 4.0 | 2.0 | 4.2 | 5.6 | 6.3 | 6.8 | 7:10 | 9:20 | 455 |
| 33 | M04 | 0.15 | II | 18.5 | 17.0 | 4.0 | 1.8 | 3.6 | 4.6 | 5.4 | 6.5 | 6:30 | 8:45 | 430 |
| 34 | M05 | 0.15 | II | 20.0 | 18.5 | 4.1 | 1.6 | 3.2 | 4.3 | 5.2 | 6.2 | 6:45 | 9:00 | 445 |
| 35 | M06 | 0.15 | II | 18.0 | 18.0 | 4.8 | 1.8 | 3.6 | 4.9 | 5.6 | 6.5 | 6:10 | 8:20 | 423 |
| 36 | M07 | 0.15 | II | 18.5 | 17.0 | 4.3 | 2.0 | 4.4 | 5.6 | 6.4 | 6.8 | 6:25 | 8:25 | 416 |
| 37 | M08 | 0.15 | II | 20.0 | 18.0 | 4.5 | 2.0 | 4.3 | 5.5 | 6.2 | 6.7 | 6:10 | 8:40 | 428 |
| 38 | M09 | 0.15 | II | 18.0 | 17.0 | 4.3 | 2.0 | 4.1 | 5.5 | 6.3 | 6.9 | 6:20 | 8:50 | 420 |
| 39 | M10 | 0.15 | II | 18.5 | 17.0 | 4.0 | 2.2 | 4.4 | 5.6 | 6.5 | 6.9 | 6:10 | 8:35 | 415 |
| 1 | control | — | I | 17.5 | 12.0 | 1.0 | 2.6 | 4.9 | 6.5 | 7.3 | 8.3 | 5:50 | 7:30 | 321 |
| 2 | SP8 | 1.0 | II | 17.0 | 17.0 | 4.1 | 2.4 | 4.5 | 6.1 | 6.9 | 7.8 | 6:00 | 8:10 | 418 |
| 3 | SP9 | 1.5 | II | 19.0 | 17.0 | 4.8 | 2.6 | 5.2 | 6.7 | 7.0 | 7.9 | 7:00 | 9:20 | 422 |
| 4 | S01 | 0.20 | II | 17.5 | 16.0 | 4.1 | 2.2 | 4.6 | 5.8 | 6.9 | 7.8 | 6:25 | 8:35 | 400 |
| 5 | A(A) | 0.18 | II | 17.0 | 16.0 | 4.2 | 2.2 | 4.7 | 6.0 | 6.9 | 7.8 | 6:10 | 8:25 | 418 |
| 6 | B01 | 0.25 | II | 19.5 | 17.5 | 4.2 | 2.0 | 4.2 | 5.7 | 6.6 | 7.7 | 6:30 | 8:40 | 413 |
| 7 | M | 0.15 | II | 20.0 | 19.0 | 4.6 | 2.2 | 4.6 | 6.1 | 6.9 | 7.7 | 6:10 | 8:20 | 422 |
| 8 | S01 GE2P | 0.20 0.041 | II | 18.5 | 16.0 | 4.2 | 2.2 | 4.6 | 5.7 | 6.8 | 7.7 | 6:30 | 8:45 | 405 |
| 9 | S01 GE2P | 0.20 2.0 | II | 19.0 | 18.0 | 4.2 | 1.9 | 3.1 | 4.0 | 4.3 | 5.8 | 6:30 | 8:40 | 400 |
| 10 | A(A) NPG | 0.20 2.3 | II | 18.5 | 17.0 | 4.6 | 1.9 | 3.1 | 4.3 | 5.2 | 6.0 | 7:10 | 9:20 | 385 |

Table heading abbreviations:
Expt. - Experiment No.
Air - Air content (% volume)
AS - Added sample
DSR - Dry shrinkage ratio (×10⁻⁴)
Amt - amount added (% by weight on cement)
St.- start of setting
End - end of setting
B - Blend
OA - immediately after addition
60 - after 60 min.
CS - compressive strength (Kgf/cm²)

We claim:

1. A shrinkage-reducing dispersing agent which comprises a graft polymer which is a polycarboxylic acid or a salt thereof, having side chains derived from at least one species selected from the group consisting of oligoalkyleneglycols, polyalcohols, polyalkylene glycols and derivatives thereof.

2. A shrinkage-reducing dispersing agent according to claim 1, wherein the polycarboxylic acid is selected from the group consisting of styrene-maleic anhydride copolymers, partial esters of said styrene-maleic anhydride copolymers, and salts thereof, allylether-maleic anhydride copolymers, isobutylene-maleic anhydride copolymers, (meth)acrylic acid-(meth)acrylic acid ester copolymers, and salts thereof.

3. A shrinkage-reducing dispersing agent according to claim 1 or claim 2, wherein the oligoalkyleneglycol is selected from the group consisting of oligoalkyleneglycol monoalkylether, alkylaminooligoalkyleneglycol, oligoalkyleneglycol alkyl phenyl ether, and derivatives thereof.

4. A shrinkage-reducing dispersing agent according to claim 1, wherein the polyalcohol is selected from the group consisting of neopentyl glycol, pentaerythritol, neopentyl glycol hydroxypivalate and derivatives thereof.

5. A shrinkage-reducing dispersing agent according to claim 1 or claim 2, wherein the polyalkylene glycol or derivative thereof has anti-foaming properties and is selected from the group consisting of ethylene oxide-propylene oxide block copolymers, ethylene oxide polymers and propylene oxide polymers, monoalkyl (1 to 14 C atoms) ethers thereof and mono esters thereof.

6. A shrinkage-reducing dispersing agent according to claim 5, wherein the derivative is a fatty acid ester, a phosphoric ester or an acetylene derivative.

7. A method of reducing the shrinkage of a cementitious composition by adding thereto a shrinkage-reducing quantity of an agent according to claim 1.

8. A low-shrinkage cementitious composition which comprises a shrinkage-reducing quantity of an agent according to claim 1.

* * * * *